(12) United States Patent
Willkie et al.

(10) Patent No.: US 6,230,012 B1
(45) Date of Patent: May 8, 2001

(54) IP MOBILITY SUPPORT USING PROXY MOBILE NODE REGISTRATION

(75) Inventors: James J. Willkie, Poway; Marcello Lioy, San Diego; Susan M. Armstrong, Encinitas, all of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/130,590

(22) Filed: Aug. 7, 1998

(51) Int. Cl.$^7$ .................................................. H04Q 7/20
(52) U.S. Cl. ........................ 455/435; 455/556; 455/557
(58) Field of Search .................................. 455/435, 433, 455/556, 557, 445, 403; 370/912, 913

(56) References Cited

U.S. PATENT DOCUMENTS

| | | | |
|---|---|---|---|
| 5,442,633 | * 8/1995 | Perkins et al. | 455/445 |
| 5,541,976 | * 7/1996 | Ghisler | 455/556 |
| 5,884,190 | * 3/1999 | Lintula et al. | 455/557 |
| 5,903,851 | * 5/1999 | Backstrom et al. | 455/557 |
| 5,943,616 | * 8/1999 | Andersson | 455/433 |
| 5,958,018 | * 9/1999 | Eng et al. | 455/403 |
| 5,999,798 | * 12/1999 | Yang | 455/557 |

OTHER PUBLICATIONS

Bao, G, "Performance Evaluation of TCP/RLP Protocol Stack Over CDMA Wireless Link", Wireless Networks, vol. 2, No. 3, 1996, pp. 229–237, XP 000625341.

Perkins, Charles E., "Mobile IP", IEEE Communications Magazine, vol. 35 No. 5, May 1997, pp. 84–86, 91–99, XP 000 657114.

* cited by examiner

Primary Examiner—Nay Maung
Assistant Examiner—Quochien B. Vuong
(74) Attorney, Agent, or Firm—Philip R. Wadsworth; Charled D. Brown; Christopher O. Edwards (57) ABSTRACT

A system and method for performing mobile node registration. The system comprises a terminal device for transmitting packetized data, and a wireless communication device coupled to said terminal device for monitoring said packetized data for an Internet Protocol (IP) address contained in an IP address request. The wireless communication device initiates mobile node registration using said IP address if said IP address request is for a static IP address. The wireless communication device prevents the terminal device from sending or receiving packetized data when initiating mobile node registration, and allows said terminal device to send and received packetized data upon completion of mobile node registration. As a result, the mobile node registration occurs transparently to the terminal device, obviating the need for the terminal device to have its own Mobile IP support.

10 Claims, 7 Drawing Sheets

IP MOBILITY SUPPORT USING PROXY MOBILE NODE REGISTRATION

BACKGROUND OF THE INVENTION

I. Field of the Invention

The present invention relates to wireless data services. More particularly, the present invention relates to a novel and improved method and system for performing proxy mobile node registration of a terminal device requesting IP mobility support.

II. Description of the Related Art

Internetworking, i.e., the connection of individual local area networks (LANs), has rapidly become very popular. The infrastructure and associated protocols commonly referred to as the "Internet" have become well known and widely used. At the heart of the Internet is the Internet Protocol (IP) which supports the routing of datagrams between the LANs as is well known in the art, and further described in Request For Comment (RFC) 791 entitled, "INTERNET PROTOCOL DARPA INTERNET PROGRAM PROTOCOL SPECIFICATION," dated September 1981.

IP is a datagram-oriented protocol which provides several services, including addressing. The IP protocol encapsulates data into an IP packet for transmission, and affixes addressing information to the header of the packet. IP headers contain 32-bit addresses that identify the sending and receiving hosts. These addresses are used by intermediate routers to select a path through the network for the packet towards its ultimate destination at the intended address. A basic concept of IP addressing is that initial prefixes of the IP address can be used for generalized routing decisions. For example, the first 16 bits of an address might identify Qualcomm, Inc., the first 20 bits identify the Qualcomm's main office, the first 26 bits identify a particular Ethernet in that office, and the entire 32 bits identify a particular host on that Ethernet. As a further example, every address in Qualcomm's IP network might be of the form (in "dotted-quad notation"): 129.46.xxx.xxx, where "xxx" refers to any allowable integer between zero and 255.

As is evident by this prefix-based routing characteristic of IP, the IP addresses contain implied geographical information about the location of a particular host on the Internet. In other words, whenever any router on the Internet receives a packet having a destination IP address that begins "129.46" the router forwards that packet in a particular direction towards the Qualcomm, Inc. network in San Diego, Calif., USA. Thus, the IP protocol allows datagrams originating at any Internet node in the world to be routed to any other Internet node in the world, given that the originating party knows the IP address of the destination party.

As mobile computing and mobile Internet access have grown in popularity, a need has arisen to provide mobile data support for mobile terminals such as laptop or palmtop computers using the IP protocol. However, as just mentioned, the IP addressing scheme used for Internet routing contains implied geographic information. In other words, if a user desires to use a fixed IP address to identify his mobile terminal, the IP packets intended for that mobile terminal will not be routed to that mobile terminal when it is away from its "home" network (i.e., the network which encompasses its fixed IP address) in the absence of some technique for "forwarding" IP packets to the mobile terminal.

For example, suppose a user decides to remove his mobile terminal from its "home" IP network at Qualcomm, Inc. in San Diego, and take it with him on a trip to Palo Alto, Calif., and there connect to Stanford University's IP network while still keeping his Qualcomm-assigned fixed IP address. Any IP datagram intended for the mobile terminal will still be routed to Qualcomm's IP network because of the geographical location information implicit in the mobile terminal's fixed IP address. Such IP packets will not be delivered to the mobile terminal while away from its "home" network unless some mechanism is in place to forward IP packets from Qualcomm's IP network to the mobile terminal at its current point of attachment to the Internet at Stanford University's IP network in Palo Alto.

In order to meet this need, RFC 2002, entitled "IP Mobility Support," dated October 1996, specifies protocol enhancements that allow transparent routing of IP datagrams to mobile nodes in the Internet. Using the techniques described in RFC 2002, each mobile node may always be identified by its "home" IP address, regardless of its current point of attachment to the Internet. While situated away from its home IP network, a mobile terminal may become associated with a "care-of" address, thereby providing forwarding information necessary to route IP datagrams to its current point of attachment to the internet. RFC 2002 accomplishes this by providing for registration of the care-of address with a "home agent." This home agent forwards IP datagrams intended for the mobile terminal by using a technique called "IP tunneling." IP tunneling involves the home agent attaching a new IP header which contains the care-of address to any arriving IP packet which has a destination address corresponding to the mobile terminal's home IP address. After arriving at the care-of address, a "foreign agent" at the care-of address strips off the IP tunneling header, and delivers the IP packet to the mobile terminal at its current point of attachment to the internet.

In this way, the techniques of RFC 2002 provide mobile data services for users who desire to relocate their mobile terminal's point of attachment to the internet without having to change the mobile terminal's IP address. This ability has several advantages. First, it allows originating nodes elsewhere on the Internet to send periodic "push" services to the mobile terminal regardless of where it is. Such services might include stock quotes or e-mail. This obviates the need for the mobile user to "dial in" or otherwise contact his home network in order to retrieve information. Furthermore, it allows the mobile terminal to relocate as often as desired, without any originating parties having to keep track of where the mobile terminal is currently located.

To increase the freedom of mobility of the mobile terminal, many mobile users will typically use wireless communication devices, such as cellular or portable phones, to connect to the Internet. In other words, many mobile users will use wireless communication devices, commonly referred to as "mobile stations," or MT2 devices, as the point of access to the land-based network. As used herein, "mobile station" or "MT2 device" will refer to any subscriber station in the public wireless radio network that is intended to be used while in motion or during halts at unspecified points. Mobile stations and MT2 devices include portable units (e.g., hand-held personal phones) and units installed in vehicles, as well as wireless local loop (WLL) telephones.

Figure 1:
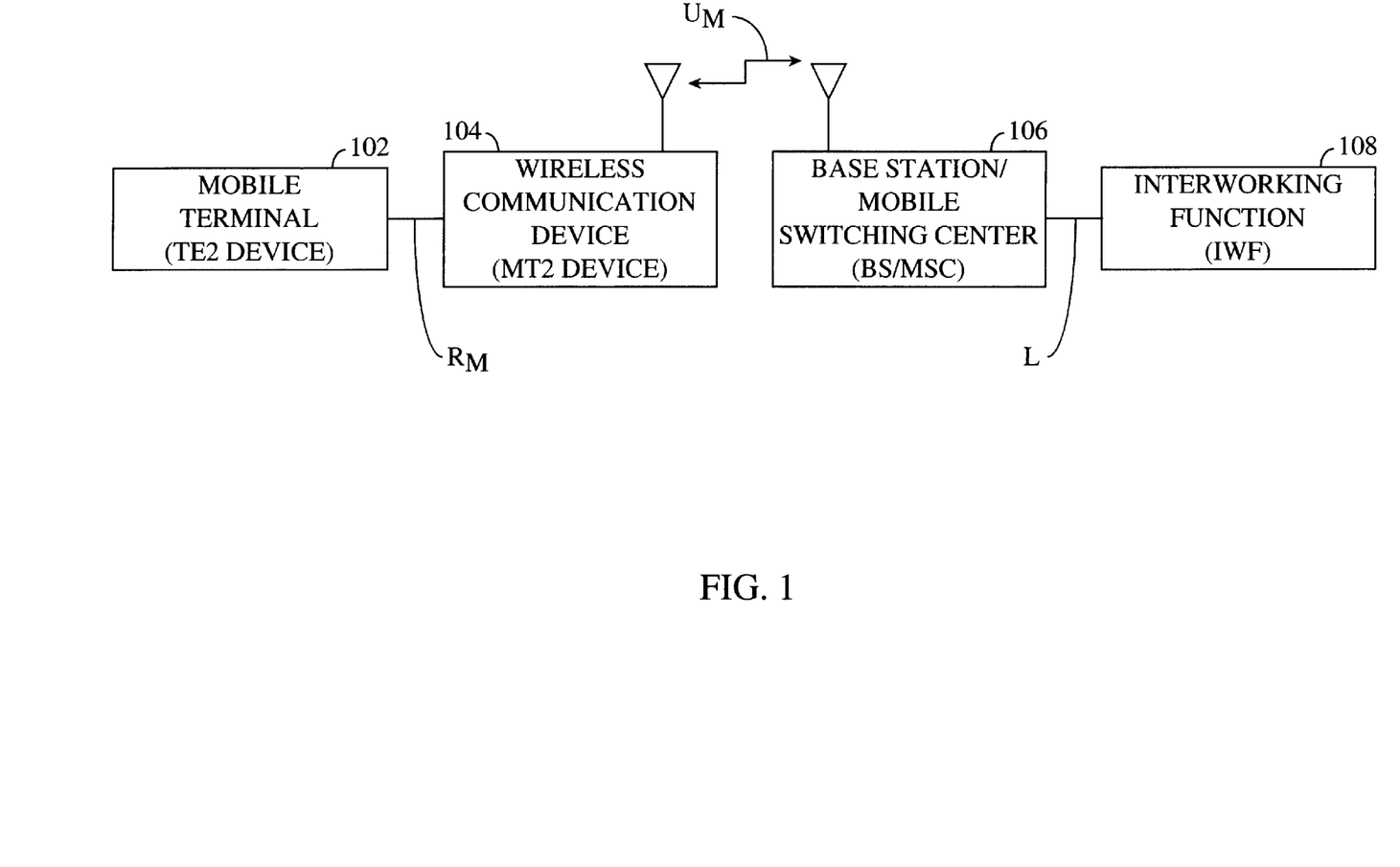
FIG. 1 illustrates a high-level block diagram of a wireless data communication system in which a terminal device connects to the internet via a wireless communication device.

FIG. 1 illustrates a high-level block diagram of a wireless data communication system in which a mobile terminal (TE2 device) 102 communicates with an Interworking Function (IWF) 108 via a wireless communication system which includes wireless communication device (MT2 device) 104 and Base Station/Mobile Switching Center (BS/MSC) 106. In FIG. 1, the IWF 108 serves as the access point to the Internet. IWF 108 is coupled to, and often co-located with BS/MSC 106, which may be a conventional wireless base station as is known in the art. TE2 device 102 is coupled to MT2 device 104, which is in turn in wireless communication with BS/MSC 106 and IWF 108.

Many protocols exist which allow data communication between the TE2 device 102 and the IWF 108. For example, Telecommunications Industry Association (TIA)/ Electronics Industries Association (EIA) Interim Standard IS-707.5, entitled "Data Service Options for Wideband Spread Spectrum Systems: Packet Data Services," published February 1998, defines requirements for support of packet data transmission capability on TIA/EIA IS-95 wideband spread spectrum systems, of which BS/MSC 106 and IWF 108 may be a part. IS-707.5 specifies a packet data bearer service that may be used for communication between TE2 device 102 and IWF 108 via BS/MSC 106. It provides procedures that can apply to multiple packet data services, including the Mobile IP service of RFC 2002, as well as Cellular Digital Packet Data (CDPD) which is described in CDPD-1995, entitled "Cellular Digital Packet Data System Specification, Version 1.1," published Jan. 29, 1995 by the CDPD Forum, Inc.

CDPD is an AMPS (analog) cellular data service, which includes some of its own support for mobility. CDPD differs from Mobile IP in several significant ways. Most notably, a CDPD modem has an assigned IP address that belongs to the CDPD network. So although a CDPD modem may roam within the CDPD network, it may not use its IP address outside of the CDPD network in the same way that a Mobile IP supported terminal may use its "home" IP address outside of its "home" network.

IS-707.5 also provides the requirements for communication protocols on the links between TE2 device 102 and the MT2 device 104 (the $R_m$ interface), between the MT2 device 104 and the BS/MSC 106 (the $U_m$ interface), and between the BS/MSC 106 and the IWF 108 (the L interface).

Figure 2:
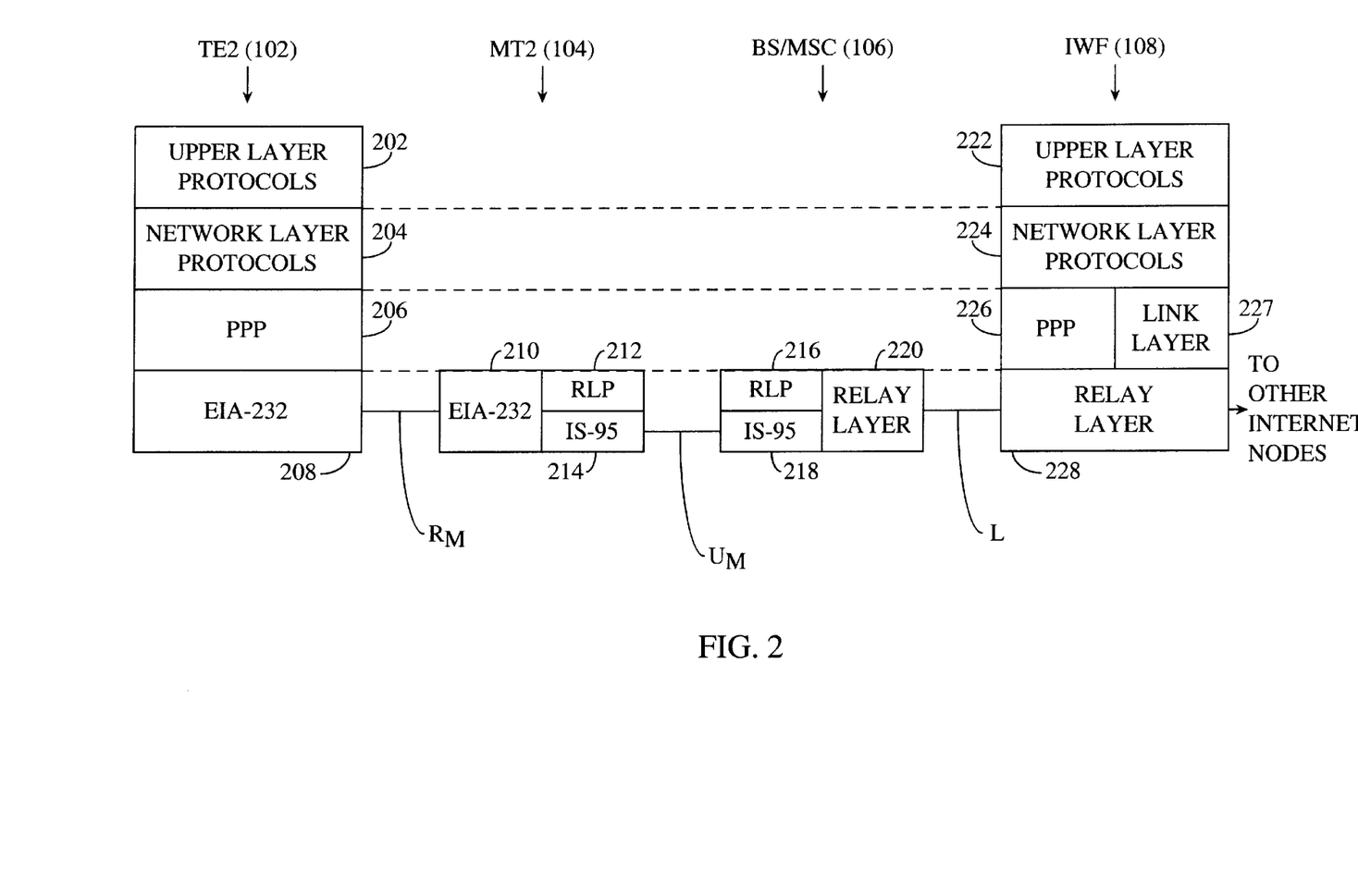
FIG. 2 is a diagram of the protocol stacks in each entity of the IS-707.5 Relay Model.

Referring now to FIG. 2, a diagram of the protocol stacks in each entity of the IS-707.5 Relay Model is shown. FIG. 2 corresponds roughly to FIG. 1.4.2.1-1 of IS-707.5. At the far left of the figure is a protocol stack, shown in conventional vertical format, showing the protocol layers running on the TE2 device 102 (e.g., the mobile terminal, laptop or palmtop computer). The TE2 protocol stack is illustrated as being logically connected to the MT2 device 104 protocol stack over the $R_m$ interface. The MT2 device 104, is illustrated as being logically connected to the BS/MSC 106 protocol stack over the $U_m$ interface. The BS/MSC 106 protocol stack is, in turn, illustrated as being logically connected to the IWF 108 protocol stack over the L interface.

An example of the operation of FIG. 2 is as follows. An upper layer protocol 202 entity, such as an application program running on the TE2 device 102 has a need to send IP packets over the Internet. An example application may be a web browser such as Netscape Navigator, or Microsoft Internet Explorer, or the like. The web browser requests a Universal Resource Locator (URL), such as http://www.qualcomm.com. A Domain Name System (DNS) protocol, also in the upper layer protocols 202, translates the textual host name www.qualcomm.com to a 32-bit numeric IP address. The Hypertext Transfer Protocol (HTTP), also an upper layer protocol 202, constructs a GET message for the requested URL, and also specifies that Transmission Control Protocol (TCP) will be used to send the message and that TCP port 80 is used for HTTP operations.

The TCP protocol, also an upper layer protocol 202, opens a connection to the IP address specified by DNS, port 80, and transmits the HTTP GET message. The TCP protocol specifies that the IP protocol will be used for message transport. The IP protocol, a network layer protocol 204, transmits the TCP packets to the IP address specified. The Point to Point Protocol (PPP), a link layer protocol 206, encodes the IP/TCP/HTTP packets and transmits them across the $R_m$ interface using the relay layer protocol 208 EIA-232 to the EIA-232-compatible port on the MT2 device. The PPP protocol is described in detail in RFC 1661, entitled "The Point-to-Point Protocol (PPP)."

The EIA-232 protocol 210 on the MT2 device 104, passes the transmitted PPP packet to a combination of the Radio Link Protocol (RLP) 212 and IS-95 protocol 214 for transmission to the BS/MSC 106 over the $U_m$ interface. The RLP protocol 212 is defined in IS-707.2, and the IS-95 protocol is defined in IS-95 mentioned above. A complementary relay layer protocol stack on the BS/MSC 106, including a combination of RLP protocol 216 and IS-95 protocol 218 receives the PPP packets over the $U_m$ interface, and passes them to the MT2 relay layer protocol 220 for the L interface to the IWF relay layer protocol 228. The MT2 relay layer protocol 220 and the IWF relay layer protocol 228 are described in TIA/EIA IS-658 entitled, "Data Services Interworking Function Interface Standard for Wideband Spread Spectrum Digital Cellular System."

The PPP protocol 226 in the link layer of the IWF decodes the PPP packets from the TE2 device 102, and serves to terminate the PPP connection between the TE2 device 102 and the IWF 108. The decoded packets are passed from the PPP protocol 226 to the IP protocol in the network layer protocols 224 of the IWF 108 for examination, and further routing to the IP address specified by the TE2 device 102 in the IP packet header (here, the IP address for www.qualcomm.com). If there are any upper layer protocol tasks to be performed at the IWF 108, such as TCP, they are performed by the upper layer protocols 222.

Assuming that the ultimate destination of the IP packets generated by the TE2 device 102 is not the IWF 108, the packets are forwarded through the network layer protocols 224, PPP protocols 226 and relay layer protocols 228 of the IWF 108 to the next router (not shown) on the Internet. In this manner, IP packets from the TE2 device 102 are communicated through the MT2 device 104, the BS/MSC 106, and the IWF 108 towards their ultimate intended destination on the Internet, thereby providing wireless packet data services for the TE2 device 102 according to the IS-707.5 standard relay model.

As illustrated in FIG. 2, the IS-707.5 standard provides the requirements for communication protocols on the links between a TE2 device 102 and an IWF 108, including the requirements for the $R_m$, the $U_m$, and the L interfaces. These requirements and procedures are applicable to supporting the Mobile IP services described in RFC 2002. However, IS-707.5 does not provide procedures for establishing Mobile IP services in the first instance. In other words, IS-707.5 provides a framework for supporting Mobile IP services, but does not provide procedures for negotiating Mobile IP services, or registering the TE2 device 102 with a home agent and a foreign agent for Mobile IP services. These procedures are found in RFC 2002 itself.

This distinction is important when one considers that typically some application layer entity must therefore exist in the TE2 device 102 to support Mobile IP. Unfortunately, the most popular operating system software for personal computing, Microsoft Windows, does not have support for Mobile IP, and is currently not forecast to have such support. As a result, TE2 devices running Microsoft Windows (or one of many other operating systems) are not able to use their "home" IP address when they are not connected to their "home" IP network. This prevents the mobile user from taking advantage of the benefits of Mobile IP services like "push" services and direct e-mail delivery while away from the "home" IP network.

What is needed is a method and system for performing Mobile IP registration of a TE2 device, with the MT2 device acting as a proxy for the TE2 device in order to establish Mobile IP support for the TE2 device.

SUMMARY OF THE INVENTION

The present invention is a novel and improved system and method for performing mobile node registration. The method includes signaling, from a terminal device, a need for mobile data services, and initiating, in a wireless communication device, mobile node registration of the terminal device in response to the signaling step. The terminal device transmits packetized data, and the wireless communication device coupled to the terminal device for monitors the packetized data for an Internet Protocol (IP) address contained in an IP address request. The wireless communication device initiates mobile node registration using the IP address if the IP address request is for a static IP address. The wireless communication device prevents the terminal device from sending or receiving packetized data when initiating mobile node registration, and allows the terminal device to send and received packetized data upon completion of mobile node registration. As a result, the mobile node registration occurs transparently to the terminal device, obviating the need for the terminal device to have its own Mobile IP support.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is intended to support transparent mobility to users of data services enabled MT2 devices. Various embodiments of the present invention are intended to support data services under three different usage models.

The first usage model is one where Mobile IP is not supported, but data services using a dynamically assigned IP address are nevertheless still supported. In this first usage model, the TE2 device is dynamically assigned an IP address by the Internet Service Provider (ISP) to which the TE2 device is currently attached. This first usage model does not use Mobile IP support, and does not use it's "home" IP address. As a result, the TE2 device receives only the data that it explicitly requests while connected to the ISP, rather than having data forwarded to it from its home IP network.

The second usage model is one where Mobile IP support is provided in the MT2 device, as a proxy on behalf of the TE2 device. This second model applies to mobile users who wish to have Mobile IP support, but who do not have a TE2 device that supports Mobile IP. For example, users of TE2 devices such as laptops that are running the Microsoft Windows operating system fall into this second usage model. In this second usage model, the TE2 device may use its "home" IP address (i.e., the "permanent" IP address assigned by its home network), whether they are attached to their home IP network, or are roaming on a Mobile IP-enabled wireless network. This second usage model also provides mobility support for devices that integrate the TE2 device and the MT2 device, such as so-called "smart phones."

The third usage model is one where Mobile IP support is provided in the TE2 device. This third usage model is applicable to users of TE2 devices that do have Mobile IP support, and therefore are not in need of proxy services from an MT2 device. The various embodiments of the present invention are intended to satisfy the requirements of one or more of these three usage models.

It will be apparent to one of ordinary skill in the art that the present invention as described below may be implemented in many different embodiments of software, firmware, and hardware in each of the entities illustrated in the figures (TE2 device 102, MT2 device 104, BS/MSC 106 and IWF 108). The actual software code or control hardware used to implement the present invention is not limiting of the present invention. Thus, the operation and behavior of the present invention will be described without specific reference to the actual software code, it being understood that a person of ordinary skill in the art would be able to design software and control hardware to implement the various embodiments of the present invention based on the description herein.

Figure 3:
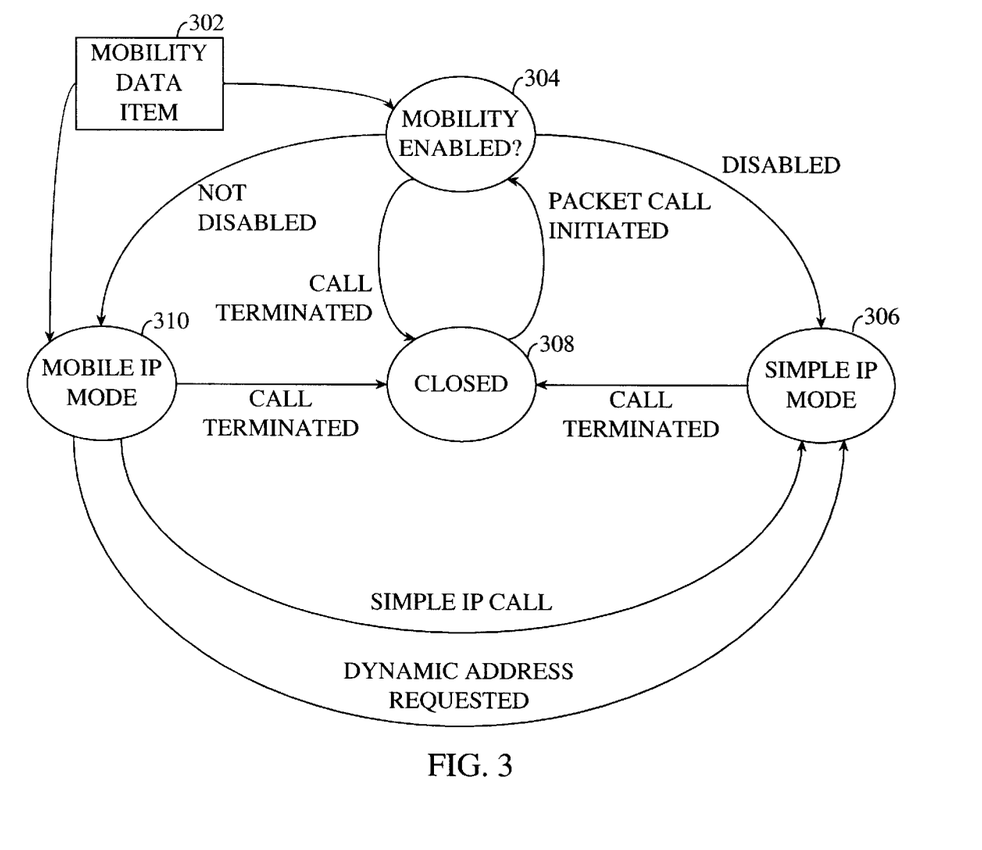
FIG. 3 is a high-level state diagram of the operation of the MT2 device of the present invention.

Turning now to FIG. 3, a high-level state diagram of the operation of the MT2 device of the present invention is illustrated. In FIG. 3, the MT2 device begins in closed state 308. In closed state 308 the MT2 device is not currently in a call, but is awaiting an origination of a call. Mobile-terminated calls (i.e., those where the MT2 device is the called party) are not considered in this state, as they assume that the MT2 device has either already been assigned an IP address, or has already registered for Mobile IP. If the MT2 device has already registered for Mobile IP, it is not in this closed state 308, but rather is in Mobile IP mode state 310, discussed more fully below.

When a packet data call is initiated from the TE2 device, the MT2 device transitions from the closed state 308 to the mobility enabled? state 304. In the mobility enabled? state 304, the MT2 device checks the value of the mobility data item 302 to determine whether mobility support (for Mobile IP) is enabled. In one embodiment, the mobility data item 302 may have one of three values which may be optionally configured by the mobile user as desired via, for example, a user interface on the TE2 device or the MT2 device. Other embodiments may use more or fewer values in order to allow the mobile user to have more or fewer configuration choices. Still other embodiments do not allow user-configuration of the mobility data item 302. In still other embodiments, the mobility data item 302 does not exist, but rather the decision is hard-coded into control software.

The first value of the mobility data item is "disabled." When the mobility data item 302 value is "disabled," the MT2 device does not support Mobile IP negotiation and registration. As a result, all packet data calls originated when the mobility data item 302 has the value "disabled" use the simple IP mode 306, discussed more fully below.

The second value is "if available." When the mobility data item 302 value is "if available," then the MT2 device will provide Mobile IP negotiation and registration unless the infrastructure (BS/MSC 106 and IWF 108) does not support Mobile IP or unless the mobile node registration attempted by the MT2 device fails. If either the infrastructure does not support Mobile IP or the mobile node registration attempt fails, then the MT2 device changes the value of the mobility data item 302 to "disabled," and the packet data call becomes a simple IP mode 306 call. In other words, the "if available" value for the mobility data item 302 allows the user of the TE2 device and MT2 device to obtain the advantages of Mobile IP when it is supported by the infrastructure and is successfully negotiated, but still allows a packet data call without Mobile IP support otherwise. In one embodiment in which the mobile user is not allowed to change the value of mobility data item 302, this second value is used. Alternately, the mobility data item 302 may always be set to "if available", or be omitted entirely, eliminating the transition between mobility enabled? state 304 and simple IP mode state 306.

The third value is "exclusively." When the mobility data item 302 value is "exclusively," then the MT2 device will provide Mobile IP negotiation and registration unless the infrastructure (BS/MSC 106 and IWF 108) does not support Mobile IP or unless the mobile node registration attempted by the MT2 device fails. However, as contrasted with the "if available" value above, if either the infrastructure does not support Mobile IP or the mobile node registration attempt fails, then the MT2 device does not complete a simple IP call, but rather forces the packet call origination attempt to fail completely. In other words, the "exclusively" value for mobility data item 302 prevents any packet data call other than a Mobile IP supported call from originating from the MT2 device.

If the mobility data item 302 value is "disabled," or if the mobility data item 302 value is "if available" but Mobile IP is not supported by the infrastructure or mobile node registration fails, then the MT2 device will enter simple IP mode 306 on a packet data call origination attempt. In one embodiment, the simple IP mode 306 employs the conventional IS-707.5 relay model as illustrated and described with reference to FIG. 2.

If the mobility data item 302 value is either "if available" or "exclusively," the MT2 device transitions from the mobility enabled? state 304 to the mobile IP mode 310. It is in this mobile IP mode 310 where the MT2 device engages in mobile node registration for Mobile IP services as a proxy on behalf of the TE2 device as described further below.

Figure 4:
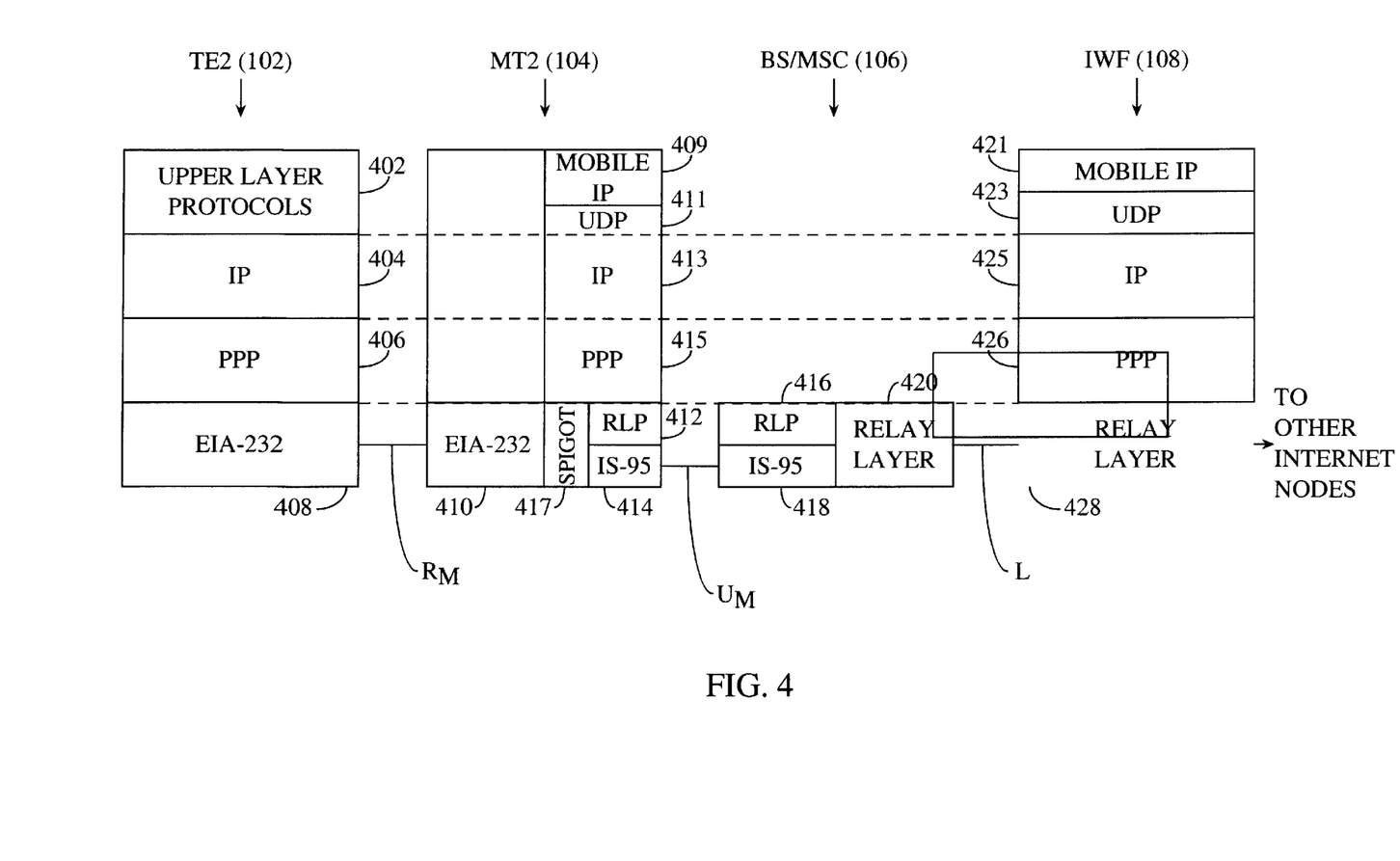
FIG. 4 is a diagram of the protocol stacks of each entity of one embodiment of the present invention.

Turning now to FIG. 4, a diagram of the protocol stacks of each entity of one embodiment of the present invention is shown. A significant difference between the diagram of FIG. 4 and that of FIG. 2 is that in FIG. 4, additional protocol layers exist in the MT2 device 104 to support the mobile node registration of the present invention. These additional protocol layers include PPP protocol 415, IP protocol 413, UDP protocol 411 and Mobile EP protocol 409. To the extent that the protocol layers of FIG. 4 operate the same as those of FIG. 2, they will not be expanded upon. Rather, the following discussion will focus on the differences between FIG. 4 and FIG. 2.

An example of the operation of FIG. 4 is as follows. An upper layer protocol 402 entity, such as an application program running on the TE2 device 102 has a need to send IP packets over the Internet, similar to that of upper layer protocol 202 entity of FIG. 2. The application generates a message using, for example, either the TCP or UDP protocols, and the TCP or UDP packet is framed by IP protocol 404 using the destination IP address. The Point to Point Protocol (PPP) protocol 406 encodes the IP packets and transmits them across the $R_m$ interface using the relay layer protocol 408 EIA-232 to the EIA-232-compatible port on the MT2 device running the EIA-232 protocol 410.

However, as is known in the art, in order to establish communications over a point-to-point link, each end of the PPP link (here, the TE2 PPP protocol 406 and IWF PPP protocol 426) must first send Link Control Protocol (LCP) packets for establishing, configuring and testing the data link connection. After the link has been established by the LCP, PPP protocol 406 then sends Network Control Protocol (NCP) packets to configure the network layer protocols (here, the TE2 IP protocol 404 and IWF IP protocol 425). After each of the network layer protocols has been configured, datagrams from each network layer protocol can be sent over the link between them.

In one embodiment, the NCP for IP is the IP Control Protocol (IPCP). The IPCP is described in detail in RFC 1332, entitled "The PPP Internet Protocol Control Protocol (IPCP)," published May 1992. The IPCP is responsible for configuring, enabling, and disabling both the TE2 IP protocol 404 and the IWF IP protocol 425 that run at either end of the point-to-point link. As is known in the art, IPCP uses configuration requests, which are messages that may include a configuration option for IP address. This configuration option portion of the configuration request message provides a way to negotiate the IP address to be used by the sender of the configure request (here, the TE2 device 102). It allows the sender of the configure request to state which IP address is desired by specifying an IP address, or to request that the peer (here, the IWF 108) provide a dynamic IP address for the sender. If the sender of the configure request sets the IP address field in the IP address configuration option to all zeros, then the peer can provide a dynamic IP address by sending a configure ACK for the option, and returning a valid IP address. If, on the other hand, the sender of the configure request sets the IP address field in the IP address configuration option to a specified IP address, the peer can indicate that the specified IP address is acceptable by sending a configure ACK for the option. The present invention takes advantage of the IPCP communications between the TE2 device 102 and the IWF 108 to determine whether and when to act as a proxy for the TE2 device during mobile node registration.

Figure 5:
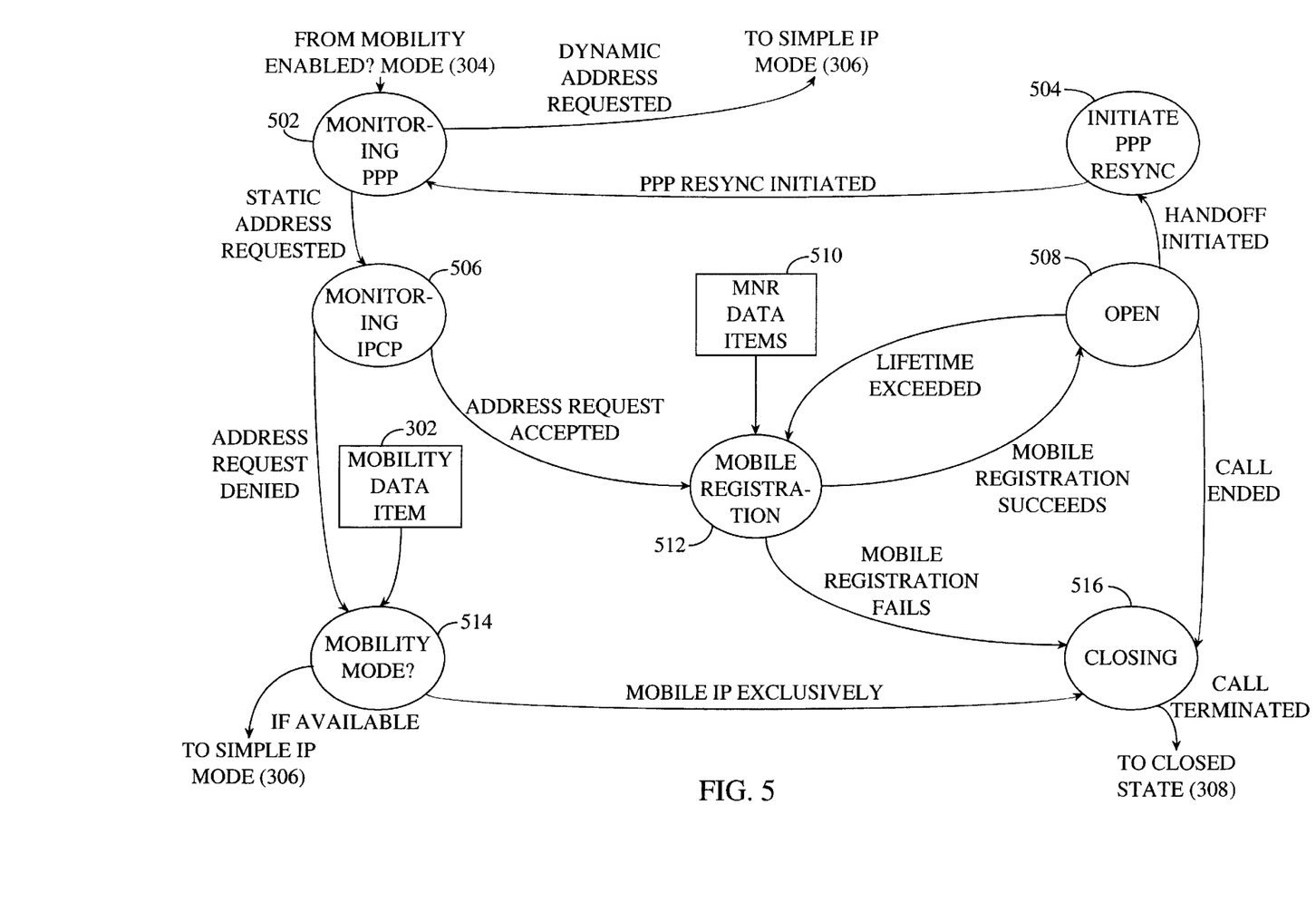
FIG. 5 illustrates an expanded state diagram of the Mobile IP mode state 310 of FIG. 3.

FIG. 5 illustrates an expanded state-diagram of the Mobile IP mode state 310 of FIG. 3 is shown. When the mobility enabled? state 304 (FIG. 3) determines that the mobility data item 302 is not disabled, it transitions to the monitoring PPP substate 502. It should be noted that it is possible to transition from any substate of FIG. 5 to the closing substate 516 if the call is ended. However, for simplicity call ended transition is illustrated only from the open substate 508 to closing substate 516.

In the monitoring PPP substate 502, the MT2 device 104 inserts a network "spigot" 417 into the MT2 device protocol stack between the RLP protocol 412 and EIA-232 protocol 410 peers. In other words, PPP packets passing between the EIA-232 protocol 410 and the RLP protocol 412 are monitored and examined by the MT2 device 104. This allows the MT2 device 104 to monitor PPP packets as they pass between the TE2 device 102 and the IWF 108.

The first LCP packet is cached by the MT2 device 104 for use after an inter-IWF handoff as will be described below with respect to the initiate PPP resync state 504. The MT2 device 104 continues to monitor the PPP packets being exchanged between the TE2 device 102 and the IWF 108 until an IPCP packet from the TE2 device 102 is detected by the MT2 device 104. This IPCP packet is then examined by the MT2 device 104 to determine whether a static or dynamic IP address is being requested in the IP address configuration option of the configuration request. If the IP address field contains an IP address that is all zeros, then the TE2 device is requesting a dynamic address. In such a case, there is no request for Mobile IP support by the TE2 device 102, and the MT2 device 104 transitions to simple IP mode 306 (FIG. 3).

If, on the other hand, the IP address field in the configure request sent by the TE2 device 102 contains a static (i.e., non-zero) IP address, the MT2 device 104 then transitions to the monitoring IPCP state 506. In the monitoring IPCP state 506, the MT2 device 104 monitors the IPCP packets being exchanged between the TE2 device 102 and the IWF 108. Specifically, the MT2 device 104 examines the IPCP packets to determine whether the static IP address request made by the TE2 device 102 has been accepted by the IWF 108 with a configure ACK.

If the static IP address request made by the TE2 device 102 is denied by the IWF 108, then the MT2 device 104 transitions to the mobility mode? State 514, where it checks the value of the mobility data item 302. If the value of the mobility data item 302 value is "if available," then the MT2 device 104 transitions to the simple IP mode state 306 (FIG. 3) because it is assumed that the user will be satisfied with a simple IP call (i.e., a dynamically assigned IP address) if Mobile IP support is unavailable. If, however, the mobility data item 302 value is "exclusive," then the MT2 device 104 transitions to the closing state 516 because it is assumed that the user will not be satisfied with a simple IP call.

If the static IP address request made by the TE2 device 102 is accepted by the IWF 108, then the MT2 device 104 transitions to the mobile registration state 512 upon completion of IPCP negotiation. In mobile registration state 512, the MT2 device 104 initiates the PPP protocol 415, the IP protocol 413, the UDP protocol 411, and the Mobile IP protocol 409. The MT2 device 104 then flow controls the TE2 device 102. As used herein, "flow control" refers to the step of preventing the TE2 device 102 from sending or receiving data over its relay layer interface. In the embodiment of FIG. 4, this is the link between the TE2 device's EIA-232 protocol 408 and the MT2 device's EIA-232 protocol 410. Software or hardware flow control may be used. For example, in one embodiment, the MT2 device 104 toggles one of the pin voltages between the MT2 device 104 and the TE2 device 102.

By flow controlling the TE2 device 102, the MT2 device 104, and specifically the IP protocol 413 may now become the IP-endpoint for the purpose of mobile node registration. This allows the MT2 device 104 to perform mobile node registration on behalf of the TE2 device 102, transparent to the TE2 device 102. Conceptually, this "shifts" the IP-endpoint from the TE2 device 102, where it otherwise would be, to the MT2 device 104.

The MT2 device 104 reads the Mobile Node Registration (MNR) data items 510. In one embodiment, these data items are stored in an appropriate non-volatile memory circuit (not shown). These MNR data items 510 are the data items needed to perform mobile node registration. These MNR data items 510 include the foreign agent IP address, the MD5 authentication key, as described in RFC 2002, and the home agent IP address.

The MT2 device 104 then performs mobile node registration as described in RFC 2002 using the static IP address requested by the TE2 device 102 and the MNR data items 510. The details of mobile node registration are described in RFC 2002, and therefore will not be described in detail here. Briefly, the mobile IP protocol 409 sends a foreign agent solicitation message to the mobile IP protocol 421 in IWF 108. This foreign agent solicitation message is passed down to the UDP protocol 411. UDP protocol 411 acts as a datagram service as is known in the art, and passes the foreign agent solicitation message to IP protocol 413 where it is packetized with the IP header of either broadcast address or the "all routers" multicast address in accordance with RFC 2002.

The IP protocol 413 then passes the IP packet to PPP protocol 415 which packetizes it into a PPP packet and forwards it to the RLP protocol 412 and IS-95 protocol 414 for transmission over the $U_m$ interface. A complementary RLP protocol 416 and IS-95 protocol 418 in the BS/MSC 106 passes the data to the relay layer protocol 420 for transmission across the L interface to relay layer protocol 428.

PPP protocol 426 then de-packetizes the PPP packets received and passes them to IP protocol 425. IP protocol 425 removes the IP header and routes the packets to the UDP protocol 423 that, in turn, passes the depacketized foreign agent solicitation message to mobile IP protocol 421. If mobile IP protocol 421 is present in IWF 108, then there is a foreign agent entity resident in the IWF 108, and it responds with an agent advertisement message which follows the reverse path back to mobile IP protocol 409 in the MT2 device 104.

The mobile IP protocol 409 then sends out a mobile node registration message to the foreign agent on the IWF 108. If the mobile node registration message is acceptable to the foreign agent, it will forward the mobile node registration message to a home agent entity resident at the TE2 device's home IP network (i.e., the one encompassing the static IP address requested by the TE2 device 102).

If the mobile node registration message is acceptable to the home agent, then the home agent creates a mobility binding for the TE2 device 102 using the "care of" address of the foreign agent. A mobility binding, as described in RFC 2002, is a routing that takes any IP packets intended for the TE2 device 102 that arrive at the TE2 device's home network and forward them to the foreign agent using IP tunneling.

Upon receiving notification from the home agent that the mobility binding has been created, the foreign agent then creates an association between the inner IP address in the tunneled packet (i.e., the static IP address requested by the TE2 device 102), and the "phone number" of the MT2 device 104. Here, the word "phone number" is used in its broadest sense to represent the identification number of the MT2 device 104. As used herein, it is intended to refer to the Mobile Identification Number (MIN) of the MT2 device 104, its Electronic Serial Number (ESN), or other unique identifier that the MT2 device 104 has registered with the BS/MSC 106 as is known in the art. The IWF 108 maintains this IP to MIN or IP to ESN translation.

In order to perform this mobile node registration, the present invention re-routes IP packets from RLP protocol 412 to MT2 PPP protocol 415 to ensure deliver of the requisite data to the mobile node registration software running at the mobile IP protocol 409 level of the MT2 device protocol stack. It should be noted that the MT2 PPP protocol 415 is not a full PPP implementation as described in RFC 1661. In the embodiment of FIG. 4, MT2 PPP protocol 415 does not perform any negotiation for protocol or link establishment, it only frames, unframes, and performs any required character escaping of IP packets that are sent and received by the MT2 device 104 during mobile registration state 512 because PPP has already been negotiated between the TE2 device 102 and the IWF 108 as described above.

If the mobile node registration described above and performed during mobile node registration state 512 fails for any reason, in one embodiment the MT2 device 104 exits the mobile IP protocol 409, the UDP protocol 411, the IP protocol 413 and the PPP protocol 415, and transitions to closing state 516. Possible reasons for failure may include the foreign agent or the home agent rejecting the mobile node registration message. In other embodiments, the MT2 device 104 may attempt to resynchronize PPP with a dynamic IP address, rather than the static IP address requested by the TE2 device.

Otherwise, upon successful mobile node registration in mobile registration state 512, the MT2 device exits the mobile IP protocol 409, the UDP protocol 411, the IP protocol 413 and the PPP protocol 415, and then transitions to the open state 508. In the open state 508, the MT2 device 104 acts in accordance with the IS-707.5 relay model as shown in FIG. 2. Once in this open state 508, the data arriving at the RLP protocol 412 of the MT2 device 104 is merely sent over the EIA-232 interface between the TE2 device 102 and the MT2 device 104.

The MT2 device remains in the open state 508 until one of three things happens: the call is ended, the MT2 device 104 is handed off to a different IWF, or the mobile registration lifetime has been exceeded. The call may be ended in many ways. For example, the user may press an "END" key (not shown) or the like on the MT2 device 104, thereby intentionally ending the data call. Another example is that the TE2 device 102 or the IWF 108 unilaterally terminates the PPP session between them. In yet another example, the data call may be terminated simply because the radio link between the MT2 device 104 and the BS/MSC 106 becomes so degraded that the call is dropped. If the call is ended in one of these ways, the MT2 device 104 transitions to the closing state 516.

In the closing state 516, the MT2 device 104 performs housekeeping functions required to shut down the mobile IP protocol stack (mobile IP protocol 409, UDP protocol 411, IP protocol 413, and PPP protocol 415) if it is still in place. Additionally, the MT2 device 104 removes the network "spigot" 417 if it is still in place. Finally, any appropriate user notification message may be displayed (for example, on a user interface, not shown) or otherwise presented to the user to indicate that the mobile IP registration process was unsuccessful. Optionally, a more detailed description of what failure occurred and a cause (if known) may also be displayed. After making any notifications and completing any housekeeping cleanup, the MT2 device 104 then transitions to the closed state 308 (FIG. 3).

Alternately, while in the open state 508, the MT2 device 104 may be handed off to another BS/MSC 106. Typically, this will happen as the MT2 device 104 moves from one geographic location to another that is outside the service area of the original BS/MSC 106. If the two BS/MSC's are not served by the same IWF 108, then an inter-IWF handoff occurs. The MT2 device 104 may detect this either by examining the IS-95 Packet Zone ID, or by noting a change in the System Identification (SID) or Network Identification (NID) of the serving BS/MSC 106. In either case, the MT2 device 104 will transition to the initiate PPP resync state 504.

In the initiate PPP resync state 504, the MT2 device 104 initiates a PPP resync with the IWF 108 by sending the first LCP packet which was cached at the beginning of PPP negotiations as described above. This invokes an exchange of LCP packets in reaction from the IWF 108. Upon detecting this exchange of LCP packets, the MT2 device then transitions back to the monitoring PPP state 502 as described above.

If, on the other hand, during the open state 508, the mobile registration lifetime as defined in RFC 2002 is exceeded, the MT2 device 104 transitions directly back to mobile registration state 512 to renegotiate mobile node registration as described above.

Thus, in the embodiment of FIG. 4, the additional protocol layers in the MT2 device 104 (PPP protocol 415, IP protocol 413, UDP protocol 411, and mobile IP protocol 409) are brought up only to perform mobile node registration in mobile registration state 512, and are shut down after leaving mobile registration state 512. All IP traffic during the time that these additional protocol layers are up initiates and terminates at the MT2 device 104. Conceptually, this "shifts" the IP endpoint from the TE2 device 102 during mobile node registration, and then back to the TE2 device 102 upon completion of mobile node registration. In this manner, the MT2 device 104 serves as a proxy for TE2 device 102 during mobile node registration, obviating the need for the TE2 device 102 to have IP mobility support of its own.

Figure 6:
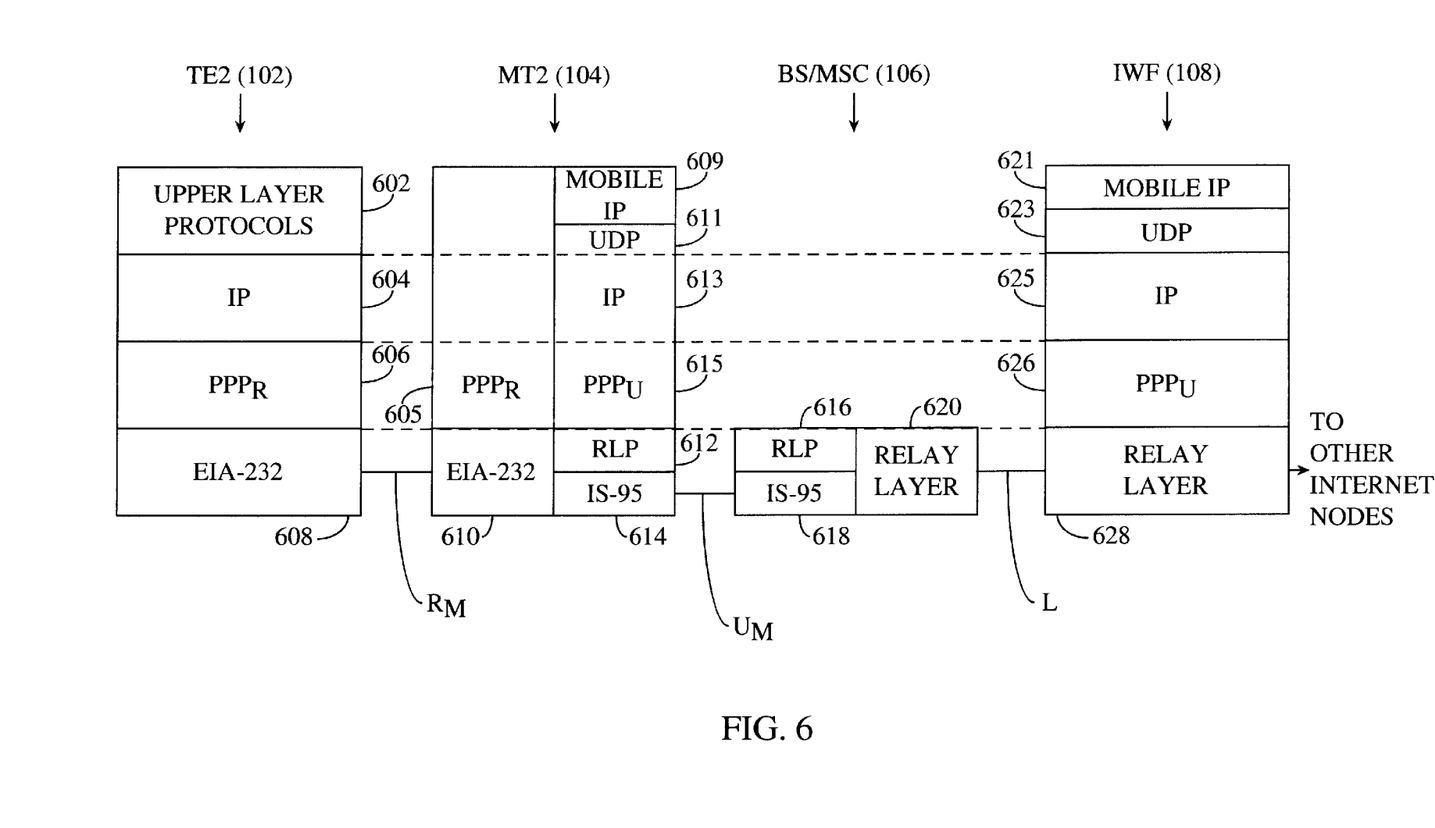
FIG. 6 is a diagram of the protocol stacks of each entity of an alternate embodiment of the present invention.

FIG. 6 shows a diagram of the protocol stacks of each entity of an alternate embodiment of the present invention. A significant difference between FIG. 6 and FIG. 4 is that in the embodiment of FIG. 6, a peer relationship exists between the MT2 device 104 and the TE2 device 102 at the PPP level. Note that $PPP_R$ protocol 605 of MT2 device 104 serves as the termination for the $PPP_R$ protocol 606 of the TE2 device 102. Note also that the $PPP_U$ protocol 626 of the IWF 108 serves as the termination for the $PPP_U$ protocol 615 of the MT2 device 104. In contrast to the embodiment of FIG. 4, these $PPP_R$ and $PPP_U$ links survive in the MT2 device 104 after mobile node registration.

Figure 7:
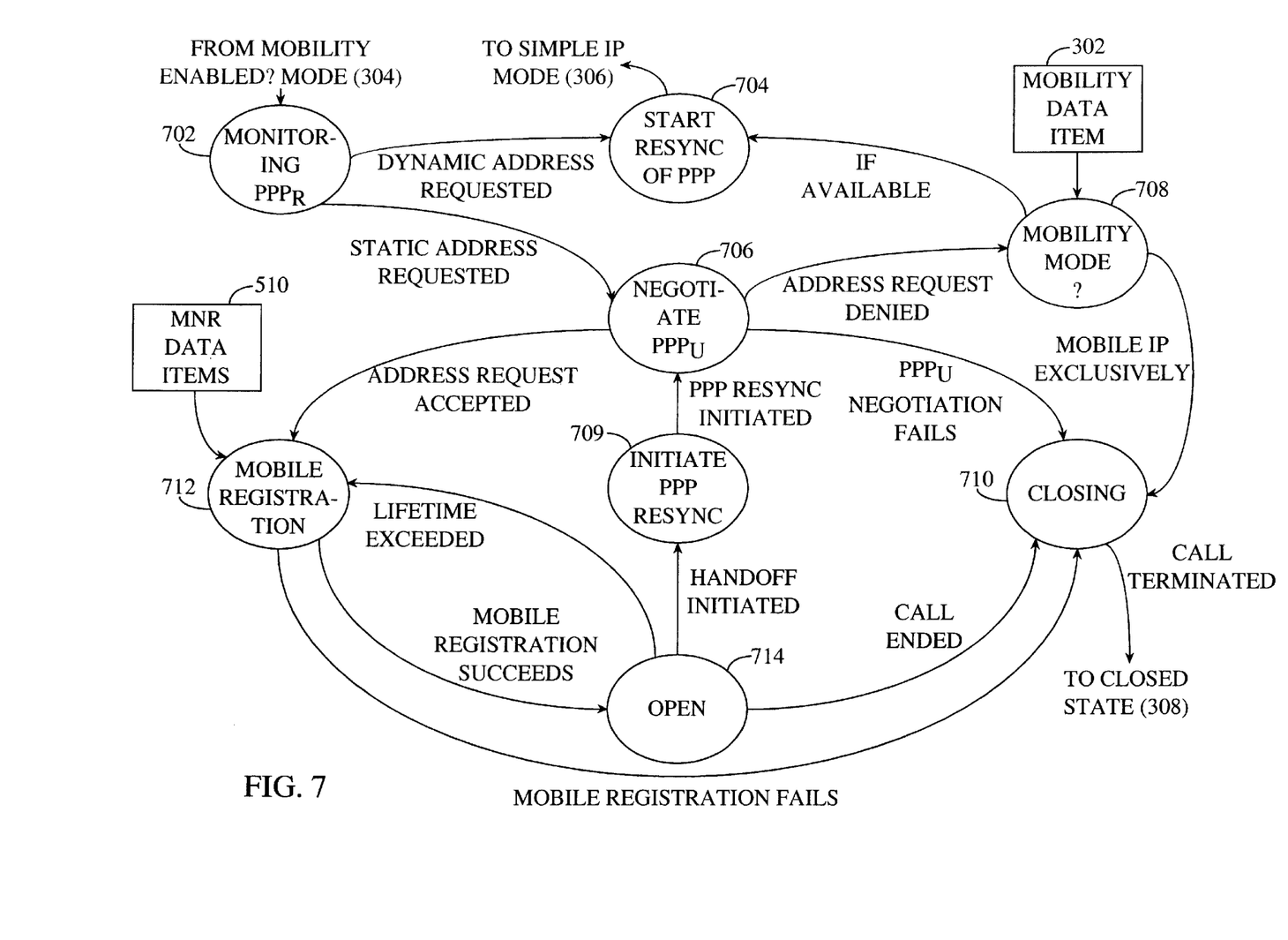
FIG. 7 illustrates an expanded state diagram of an alternate embodiment of Mobile IP mode 310 of FIG. 3.

The operation of FIG. 6 will be explained with reference also to the state diagram of FIG. 7. FIG. 7 is a state diagram of an alternate embodiment of Mobile IP mode 310 of FIG. 3. The MT2 device 104 begins in monitoring $PPP_R$ state 702. In the monitoring $PPP_R$ state 702 the MT2 device 104 initiates the $PPP_R$ protocol 605, and negotiates the $PPP_R$ link between the MT2 device 104 and the TE2 device 102. The MT2 device 104 also caches the first LCP packet received from the TE2 device 102 for use in a PPP resync later, if required.

The MT2 device 104 continues to monitor the PPP$_P$ link looking for the TE2 device's IPCP configure request. Upon detecting the TE2 device's IPCP configure request, the MT2 device 104 examines the IP address field. If the requested IP address is dynamic, that is, all zeros, then the MT2 device 104 transitions to start resync of PPP state 704.

In the start resync of PPP state 704, the MT2 device 104 shuts down the PPP$_R$ protocol 605, and forwards the original LCP packet (cached earlier in the monitoring PPP$_R$ state 702) to the IWF 108, thereby initiating a PPP link directly between the TE2 device 102 and the IWF 108. This is done to avoid the overhead of running the PPP$_R$ protocol 605 and PPP$_U$ protocol 615 on the MT2 device 104 for a simple IP call. Since a dynamic address was requested, the extra PPP layers in the MT2 device 104 are unnecessary, and the normal IS-707.5 relay model of FIG. 2 applies.

If, however, the TE2 device's IPCP configure request contains a static IP address, then the MT2 device 104 transitions to the negotiate PPP$_U$ state 706 after the PPP$_R$ link has been fully negotiated in the monitoring PPP$_R$ state 702. Once in the negotiate PPP$_U$ state 706, the MT2 device 104 initiates the additional layers in the MT2 protocol stack including mobile IP protocol 609, UDP protocol 611, IP protocol 613, and PPP$_U$ protocol 615. The MT2 device 104 also flow controls the TE2 device 102. Again, flow control refers to preventing the TE2 device 102 from sending or receiving any data over the R$_M$ interface.

The MT2 device 104 then negotiates the PPP$_U$ link between the PPP$_U$ protocol 615 and PPP$_U$ protocol 626. In the negotiation of the PPP$_U$ link, the MT2 device 104 uses the same parameters as were requested by the TE2 device 102 during negotiation of the PPP$_R$ link. Specifically, the static IP address requested by the TE2 device 102 from the MT2 device 104 is used by the MT2 device 104 in negotiating the PPP$_U$ link with the IWF 108.

During the PPP$_U$ link negotiation, the MT2 device 104 monitors the IPCP packets returned by the IWF 108. If the IPCP configure request containing the static IP address is rejected by the IWF 108, then the MT2 device 104 transitions to the mobility mode state 708.

In mobility mode state 708, the mobility data item 302 is checked. If the mobility data item 302 value is "if available," then the MT2 device 104 transitions to the start resync of PPP state 704 in preparation for a simple IP call attempt in simple IP mode 306. If the mobility data item 302 value is "mobile IP exclusively," then the MT2 device 104 transitions to the closing state 710. Closing state 710 is similar in operation to closing state 516 of FIG. 5.

If the IPCP configure request containing the static IP address is accepted by the IWF 308, then the MT2 device 104 transitions to mobile registration state 712. The condition of the system upon entry into the mobile registration state 712 is that from the point of view of the TE2 device 102, the IP address of the MT2 device 104 appears to be that of the IWF 108. Furthermore, from the point of view of the IWF 108, the IP address of the MT2 device 104 appears to be that of the TE2 device 102. In other words, the MT2 device 104 is maintaining two IP addresses as between PPP$_R$ protocol 605 and PPP$_U$ protocol 615. As a result, the MT2 device 104 passes PPP packets between PPP$_R$ protocol 605 and PPP$_U$ protocol 615 without regard to the IP addresses.

The mobile registration state 712 is very similar to the mobile registration state 512 of FIG. 5, with some significant exceptions. First, in mobile registration state 712 mobile registration packets are passed from PPP$_U$ protocol 615 up to IP protocol 613 rather than to PPP$_R$ protocol 605. This is different from the operation of FIGS. 4 and 5 in that the routing of mobile registration packets occurs at one layer higher in the MT2 protocol stack. Second, no network spigot is needed in the embodiment of FIG. 6 because the PPP$_U$ protocol 615 serves to terminate the PPP link between the MT2 device 104 and IWF 108. As a result, all the PPP packets exchanged during negotiation with the IWF 108 are originated and terminated with the MT2 device 104 itself, rather than the MT2 device 104 needing to "eavesdrop" on PPP negotiation between the TE2 device 102 and the IWF 108 as is the case with respect to the embodiment of FIGS. 4 and 5.

If the mobile node registration succeeds in mobile registration state 712, then the MT2 device 104 transitions to open state 714. The open state 714 is very similar to the open state 508 of FIG. 5. A significant difference between the embodiment of FIG. 7 and FIG. 5 is that in FIG. 7 the PPP$_R$ protocol 605 and PPP$_U$ protocol 615 remain in place during the open state 714. As a result, IP packets from arriving at the MT2 device over the U$_m$ interface are routed by the RLP protocol 612 to the PPP$_U$ protocol 615, and in turn to PPP$_R$ protocol 605 and then EIA-232 protocol 610, rather than directly to the EIA-232 protocol 610. Similarly, all IP packets received by the MT2 device 104 over the R$_m$ interface are routed by the EIA-232 protocol 610 to PPP$_R$ protocol 605, and in turn PPP$_U$ protocol 615 and RLP protocol 612, rather than directly to RLP protocol 612.

If an inter-IWF handoff occurs during open state 714, then the MT2 device 104 transitions to the initiate PPP resync state 708. Initiate PPP resync state 708 operates similarly to that of initiate PPP resync state 504. It should be noted, however, that in initiate PPP resync state 708, only the PPP$_U$ link is renegotiated rather than the PPP$_R$ link. As a result, the PPP$_R$ link remains unchanged making the inter-IWF handoff transparent to the TE2 device 102 and therefore no cached LCP packets are required.

If the call is ended while in open state 714 (or indeed, any other state of FIG. 7), the MT2 device 104 transitions to closing state 710. Closing state 710 is very similar to closing state 516 of FIG. 5. However, in closing state 710, there is no network spigot that needs removing. Additionally, depending on the timing of the call ending, there may remain some PPP instances that are in mid-negotiation. In any event, the MT2 device 104 shuts down Mobile IP protocol 609, UDP protocol 611, IP protocol 613, PPP$_R$ protocol 605, and PPP$_U$ protocol 615 if they are running. As in the embodiment of FIG. 5, the reason for call failure may optionally be displayed.

Thus, in the embodiment of FIG. 6, the additional protocol layers in the MT2 device 104 (down Mobile IP protocol 609, UDP protocol 611, and IIP protocol 613) are brought up only to perform mobile node registration in mobile registration state 712, and are shut down after leaving mobile registration state 712. However, PPP$_R$ protocol 605 and PPP$_U$ protocol 615 remain intact during the open state 714. In this manner, the MT2 device 104 serves as a proxy for TE2 device 102 during mobile node registration, obviating the need for the TE2 device 102 to have IP mobility support of its own.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for performing mobile node registration of a terminal device which is coupled to a wireless communication device, said method comprising the steps of:

signaling, from said terminal device, a need for mobile data services; and initiating, in said wireless communication device, mobile node registration of said terminal device in response to said signaling step; wherein said signaling step comprises transmitting packetized data from said terminal device to said wireless communication device, and wherein said initiating step further comprises the steps of:

monitoring, in said wireless communication device, said packetized data for an Internet Protocol (IP) address contained in an IP address request; and initiating, in said wireless communication device, mobile node registration using said IP address if said IP address request is for a static IP address.

2. The method of claim 1 wherein said step of initiating mobile node registration comprises the step of said wireless communication device preventing said terminal device from sending or receiving said packetized data.

3. The method of claim 2 further comprising the step of said wireless communication device allowing said terminal device to send and received packetized data upon completion of said mobile node registration.

4. The method of claim 3 wherein said step of monitoring includes examining packets exchanged between said internet node and said terminal device.

5. The method of claim 3 wherein said step of monitoring includes examining packets exchanged between said wireless communication device and said terminal device.

6. A system for performing mobile node registration, the system comprising:

a terminal device for signaling a need for mobile data services; and a wireless communication device for initiating mobile node registration of said terminal device in response to said signaling; wherein said terminal device signals said need for mobile data services by transmitting packetized data, and wherein said wireless communication device monitors said packetized data for an Internet Protocol (LIP address contained in an IP address request, and initiates mobile node registration using said IP address if said IP address request is for a static IP address.

7. The system of claim 6 wherein said wireless communication device prevents said terminal device from sending or receiving said packetized data when initiating mobile node registration.

8. The system of claim 7 wherein said wireless communication device allows said terminal device to send and received packetized data upon completion of said mobile node registration.

9. The system of claim 8 wherein said wireless communication device examines packets exchanged between said internet node and said terminal device when monitoring said packetized data for said IP address.

10. The system of claim 8 wherein said wireless communication device examines packets exchanged between said wireless communication device and said terminal device when monitoring said packetized data for said IP address.

* * * * *